US012391158B2

(12) United States Patent
Pline et al.

(10) Patent No.: US 12,391,158 B2
(45) Date of Patent: Aug. 19, 2025

(54) CHILD RESTRAINT SYSTEM ANCHOR

(71) Applicant: Ford Global Technologies, LLC, Dearborn, MI (US)

(72) Inventors: Kevin Pline, Plymouth, MI (US); Derek Board, Ferndale, MI (US); Anil Kalra, Canton, MI (US); Matthew Isakson, Cincinnati, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 18/178,786

(22) Filed: Mar. 6, 2023

(65) Prior Publication Data

US 2024/0300390 A1  Sep. 12, 2024

(51) Int. Cl.
*B60N 2/28*  (2006.01)
(52) U.S. Cl.
CPC ................. *B60N 2/2809* (2013.01)
(58) Field of Classification Search
CPC .................. B60N 2/2809; B60N 2/2821
USPC ............................................. 297/254, 256.16
See application file for complete search history.

(56) References Cited

U.S. PATENT DOCUMENTS

| | | | | |
|---|---|---|---|---|
| 5,695,243 A * | 12/1997 | Anthony | .............. | B60N 2/2809 297/250.1 |
| 8,444,222 B2 * | 5/2013 | Buckingham | ........ | B60N 2/2809 297/256.16 |
| 9,061,611 B2 * | 6/2015 | Love | .................... | B60N 2/2884 |
| 10,780,800 B2 * | 9/2020 | Kaiser | .................. | B60N 2/2884 |
| 2005/0006934 A1 * | 1/2005 | Rabeony | .............. | B60N 2/2809 297/250.1 |
| 2008/0296944 A1 * | 12/2008 | Nakagawa | ........... | B60N 2/2809 297/256.16 |
| 2010/0109394 A1 * | 5/2010 | Ruthinowski | ............. | F16F 7/00 267/140.13 |
| 2010/0301658 A1 * | 12/2010 | Furas | ..................... | B60N 2/286 297/463.1 |
| 2011/0193394 A1 * | 8/2011 | Stiyer | .................. | B60N 2/2809 297/463.1 |
| 2012/0146369 A1 * | 6/2012 | Gaudreau, Jr. | ...... | B60N 2/2809 297/216.11 |
| 2014/0203605 A1 * | 7/2014 | Cheng | .................. | B60N 2/2887 297/250.1 |

(Continued)

FOREIGN PATENT DOCUMENTS

DE    202017007269 U1    7/2020
EP      3461683 A1       4/2019

(Continued)

OTHER PUBLICATIONS

"The importance of the Top Tether in child restraint systems," www.fundacionmapfre.org Blog, Oct. 4, 2022, 5 pages.

*Primary Examiner* — Jose V Chen
(74) *Attorney, Agent, or Firm* — Frank A. MacKenzie; Brooks Kushman P.C.

(57) ABSTRACT

A vehicle includes a vehicle seat having a seat frame. The vehicle includes a lock fixed relative to the vehicle seat. The lock is movable from an unlocked position to a locked position. The vehicle includes a child restraint system anchor having a loop and a webbing extending from the loop to the lock. The webbing is engageable with the lock and releasably lockable relative to the vehicle seat in the locked position and movable relative to the vehicle seat in the unlocked position.

20 Claims, 8 Drawing Sheets

(56) References Cited

U.S. PATENT DOCUMENTS

| | | | |
|---|---|---|---|
| 2015/0336481 A1* | 11/2015 | Horsfall | B60N 2/2806 |
| | | | 297/256.16 |
| 2016/0082865 A1* | 3/2016 | Zhou | B60N 2/2821 |
| | | | 297/216.11 |
| 2017/0217337 A1* | 8/2017 | Sammons | B60N 2/2809 |
| 2018/0297496 A1* | 10/2018 | Pline | B60N 2/286 |
| 2019/0054841 A1* | 2/2019 | Cech | B60N 2/2806 |
| 2019/0084448 A1* | 3/2019 | Hoover | B60N 2/2809 |
| 2019/0184863 A1* | 6/2019 | Schmitz | B60N 2/2821 |
| 2020/0298792 A1* | 9/2020 | Eaton | B60N 2/2809 |
| 2021/0229626 A1* | 7/2021 | Demirovic | B60N 2/268 |

FOREIGN PATENT DOCUMENTS

| | | |
|---|---|---|
| JP | 1159246 A | 3/1993 |
| JP | 2003312335 A | 11/2003 |
| JP | 2004090694 A | 3/2004 |

\* cited by examiner

CHILD RESTRAINT SYSTEM ANCHOR

BACKGROUND

Child restraint systems are removable seats for seating and restraining children riding in a vehicle. Types of child restraint systems include rearward-facing child restraint systems, forward-facing child restraint systems, combination seats that can face rearward or forward, and booster seats. Rearward-facing, forward-facing, and combination child restraint systems include a harness for restraining the child occupant. Booster seats rely on the seatbelts included with the vehicle. Child restraint systems may be held in place by the seatbelt of the vehicle and/or may include tethers for attaching to tether attachment brackets of the vehicle.

Vehicles are equipped with anchors for anchoring the child restraint system to the vehicle. Specifically, the anchor may provide for anchoring of the child restraint system to a vehicle seat and/or to a body of the vehicle. Child restraint systems include anchoring for connecting the anchor of the vehicle. The anchor of the vehicle and the anchoring system of the child restraint system may be configured to comply with a standard, e.g., ISOFIX (e.g., ISO216), which is an international standard for attachment points for child safety seats in passenger cars; LATCH ("Lower Anchors and Tethers for Children") in the United States; LUAS ("Lower Universal Anchorage System"); Canfix in Canada; UCSSS ("Universal Child Safety Seat System").

DETAILED DESCRIPTION

Figure 1:
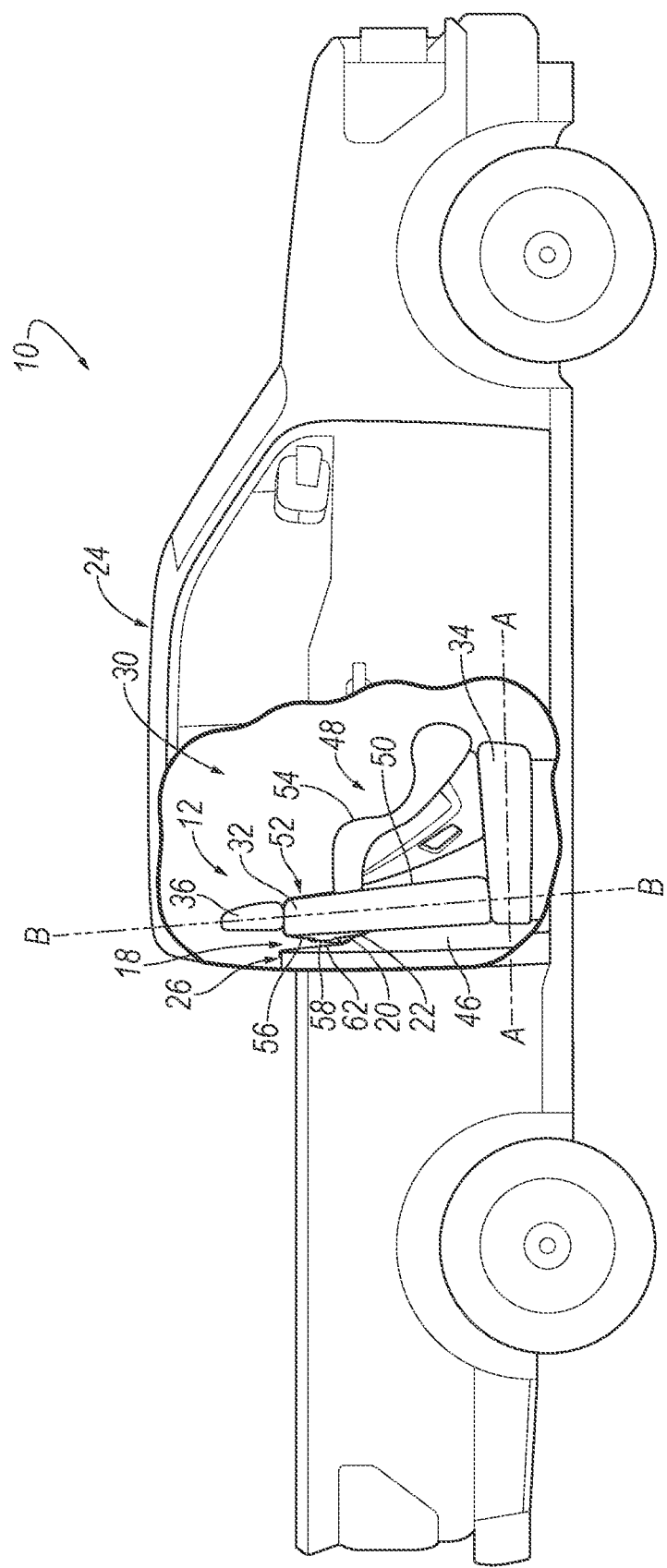
FIG. 1 is a side view of a vehicle having a child restraint system installed in a seat of the vehicle.

A vehicle includes a vehicle seat having a seat frame. The vehicle includes a lock fixed relative to the vehicle seat. The lock is movable from an unlocked position to a locked position. The vehicle includes a child restraint system anchor having a loop and a webbing extending from the loop to the lock. The webbing is engageable with the lock and releasably lockable relative to the vehicle seat in the locked position and movable relative to the vehicle seat in the unlocked position.

The vehicle seat may include a seatback and the seatback includes the seat frame. The lock may be fixed to the seatback, and the webbing extending through the seatback to the lock.

The vehicle may include a vehicle body panel adjacent the seatback. The child restraint system anchor may be connected to the vehicle body panel between the vehicle body panel and the seatback of the vehicle seat.

The vehicle may include a tether fixed to vehicle body panel between the vehicle seat and the vehicle body panel.

The seatback may include a bolster vehicle-outboard of the loop, the lock being fixed at the bolster.

The seatback may be elongated along an axis, the webbing extending along the axis.

The vehicle seat includes a seat bottom and a seatback supported by the seat bottom. The seat bottom and the seatback may include the seat frame. The lock may be fixed relative to the seat bottom. The webbing extends along the seat bottom and the seatback to the lock.

The seatback may be elongated along a first axis and the seat bottom is elongated along a second axis transverse to the first axis. A first portion of the webbing may extend along the first axis and a second portion of the webbing may extend along the second axis.

The webbing may extend along the seatback and the seat bottom from the loop to the lock.

The webbing may be disposed behind the seatback and below the seat bottom from the loop to the lock.

The seat frame may include a pair of upright frame members spaced cross-seat from each other and a first cross-member extending from one upright frame member to the other upright frame member. The lock may be fixed to one of the upright frame members.

The seat frame may include a second cross-member extending from one upright frame member to the other upright frame member and a beam extending diagonally from an upright frame member to the second cross-member. The webbing may extend from the loop, around the beam, and to the lock.

The upright frame members may extend along a first axis and the cross-members extend along a second axis. A first portion of the webbing may extend along the first axis and a second portion of the webbing may extend along the second axis.

The vehicle may include a vehicle body panel adjacent the vehicle seat. The child restraint system anchor may be connected to the vehicle body panel between the vehicle body panel and the vehicle seat.

The vehicle seat may include a seat bottom and a seatback supported by the seat bottom and the vehicle seat defines an occupant seating area. The seat bottom may be between the occupant seating area and the webbing.

The seat bottom may be between the occupant seating area and lock.

The seatback may be between the occupant seating area and child restraint system anchor.

The seatback may be between the occupant seating area and the vehicle body panel.

The vehicle may include a tether fixed to the vehicle body panel and the tether extending from the vehicle body panel to the child restraint system anchor.

The vehicle may include a vehicle floor. The vehicle seat may be supported by the vehicle floor and the lock is fixed between the vehicle seat and the vehicle floor.

With reference to the Figures, wherein like numerals indicate like parts throughout the several views, a vehicle 10 includes a vehicle seat 12 having a seat frame 14. The vehicle 10 includes a lock 16 fixed relative to the vehicle seat 12. The lock 16 is movable from an unlocked position to a locked position. The vehicle 10 includes a child restraint system anchor 18 (hereinafter referred to as "anchor 18")

having a loop 20 and a webbing 22 extending from the loop 20 to the lock 16. The webbing 22 is engageable with the lock 16 and releasably lockable relative to the vehicle seat 12 in the locked position and movable relative to the vehicle seat 12 in the unlocked position.

The anchor 18 is designed to be connectable to a child restraint system 54 to install the child restraint system 54 into the vehicle 10. The lock 16, the webbing 22, and the loop 20 allow for access to an occupant or a user to connect the child restraint system 54 to the anchor 18. The locations of the lock 16, the webbing 22, and the loop 20 allow for access to be obtained without moving the seat 12 or other components of the vehicle 10 to install the child restraint system 54 in the vehicle 10. The lock 16 allows the occupant or the user to remove slack from the webbing 22 and to maintain tension in the webbing 22 after the webbing 22 is tightened.

Figure 3:
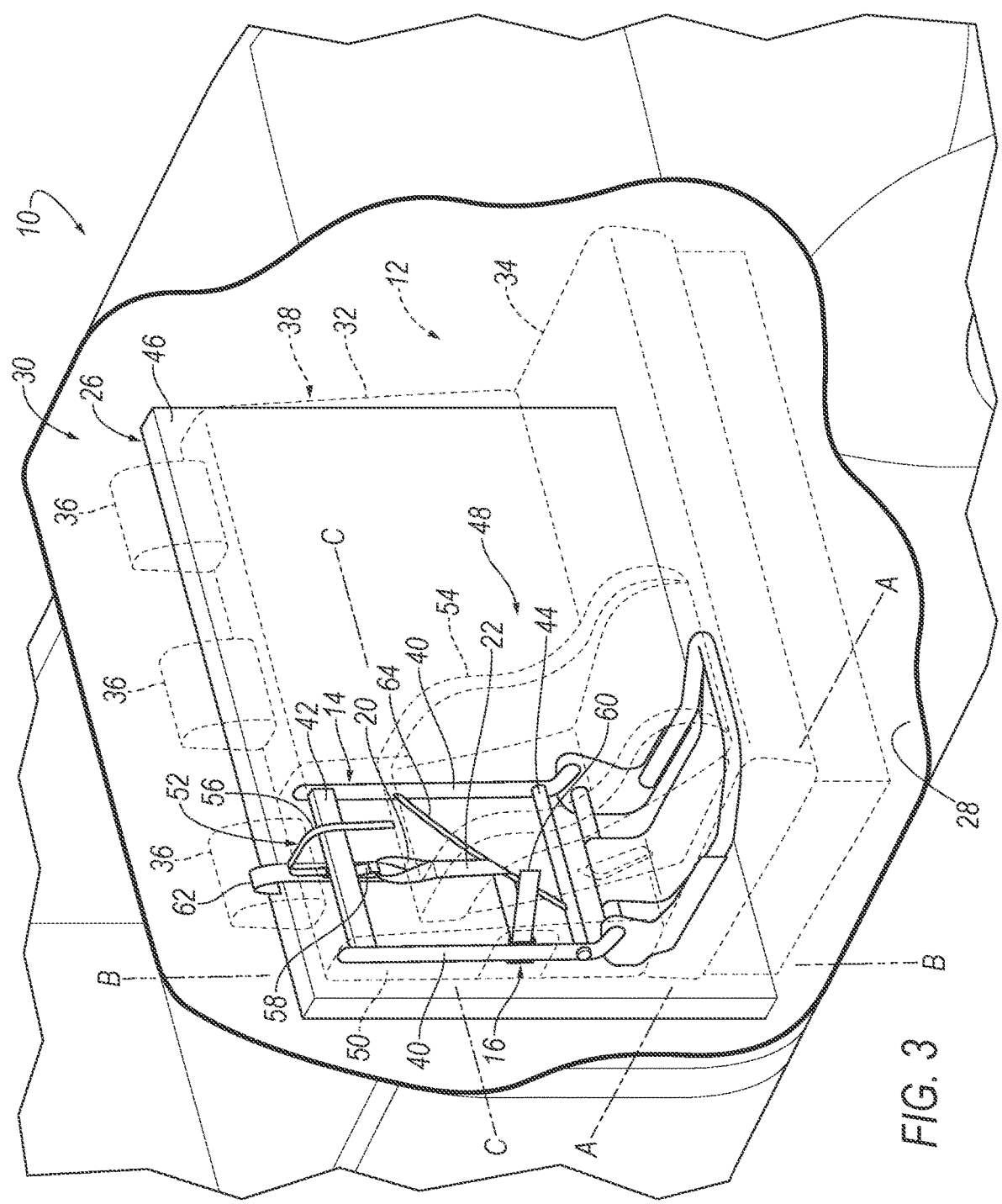
FIG. 3 is a perspective view of a first example of a child restraint system anchor in a raised position.
Figure 4:
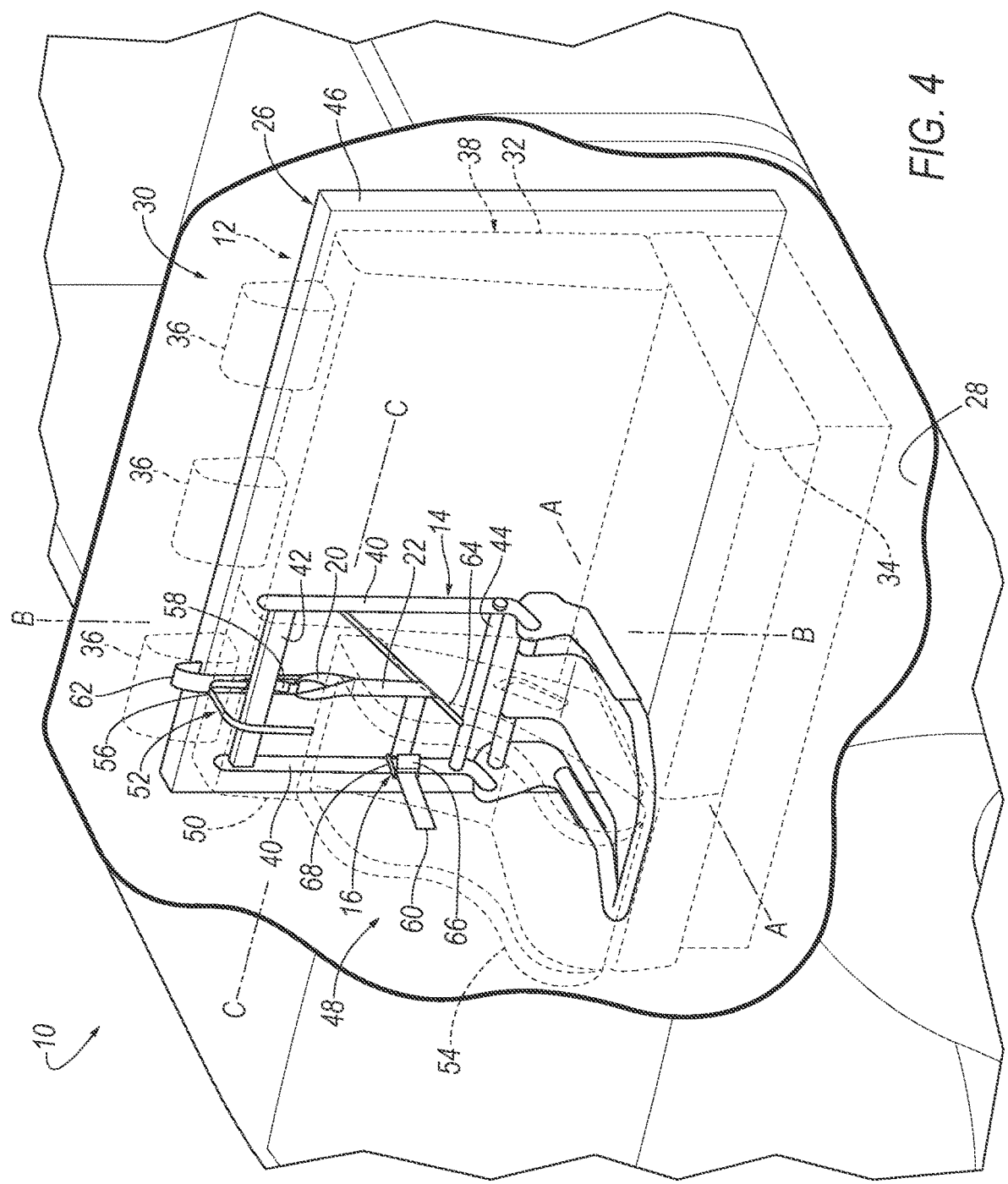
FIG. 4 is another perspective view of the first example the child restraint system anchor in a raised position.
Figure 5:
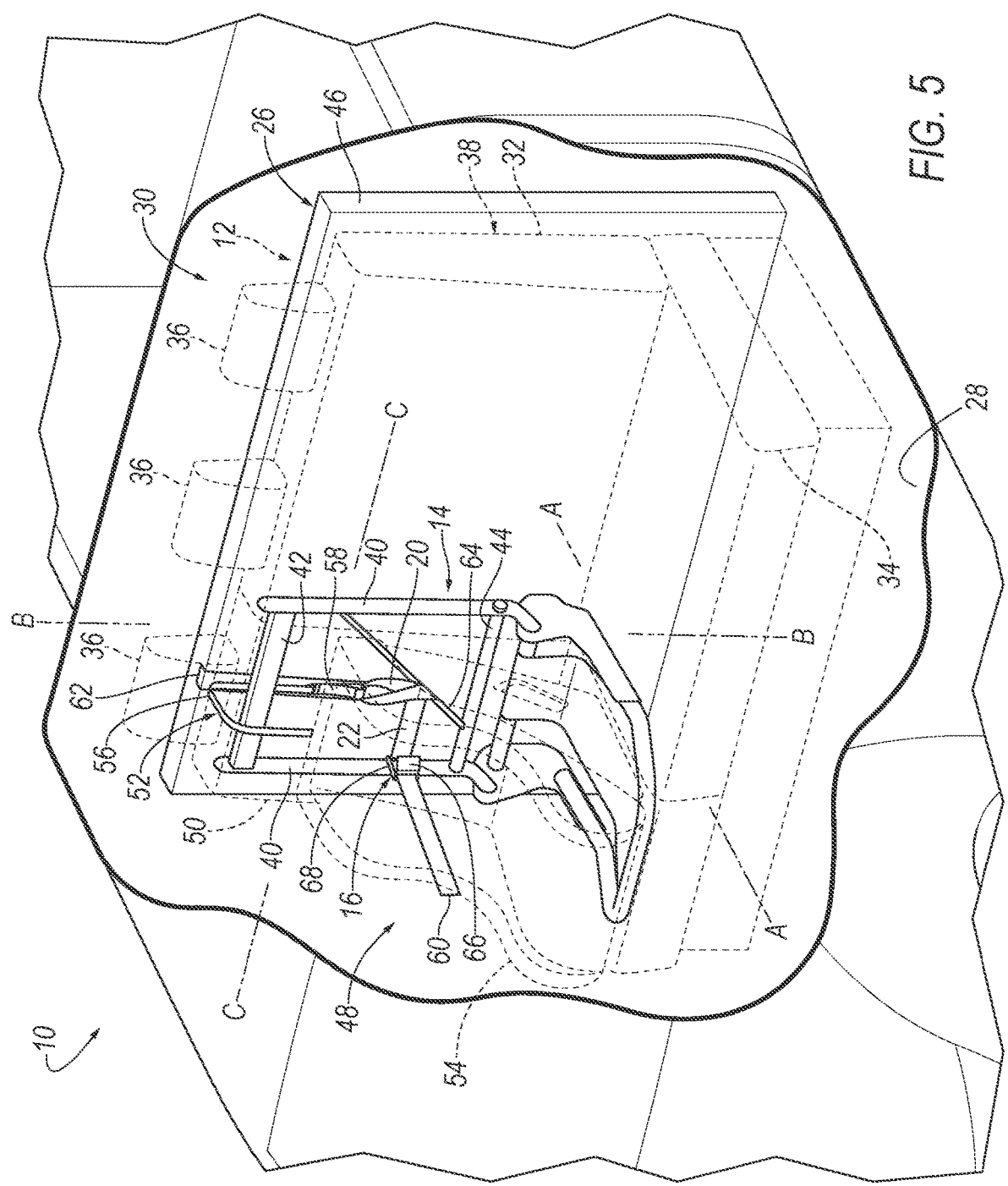
FIG. 5 is a perspective view of the first example of the child restraint system anchor in a lowered position.
Figure 6:
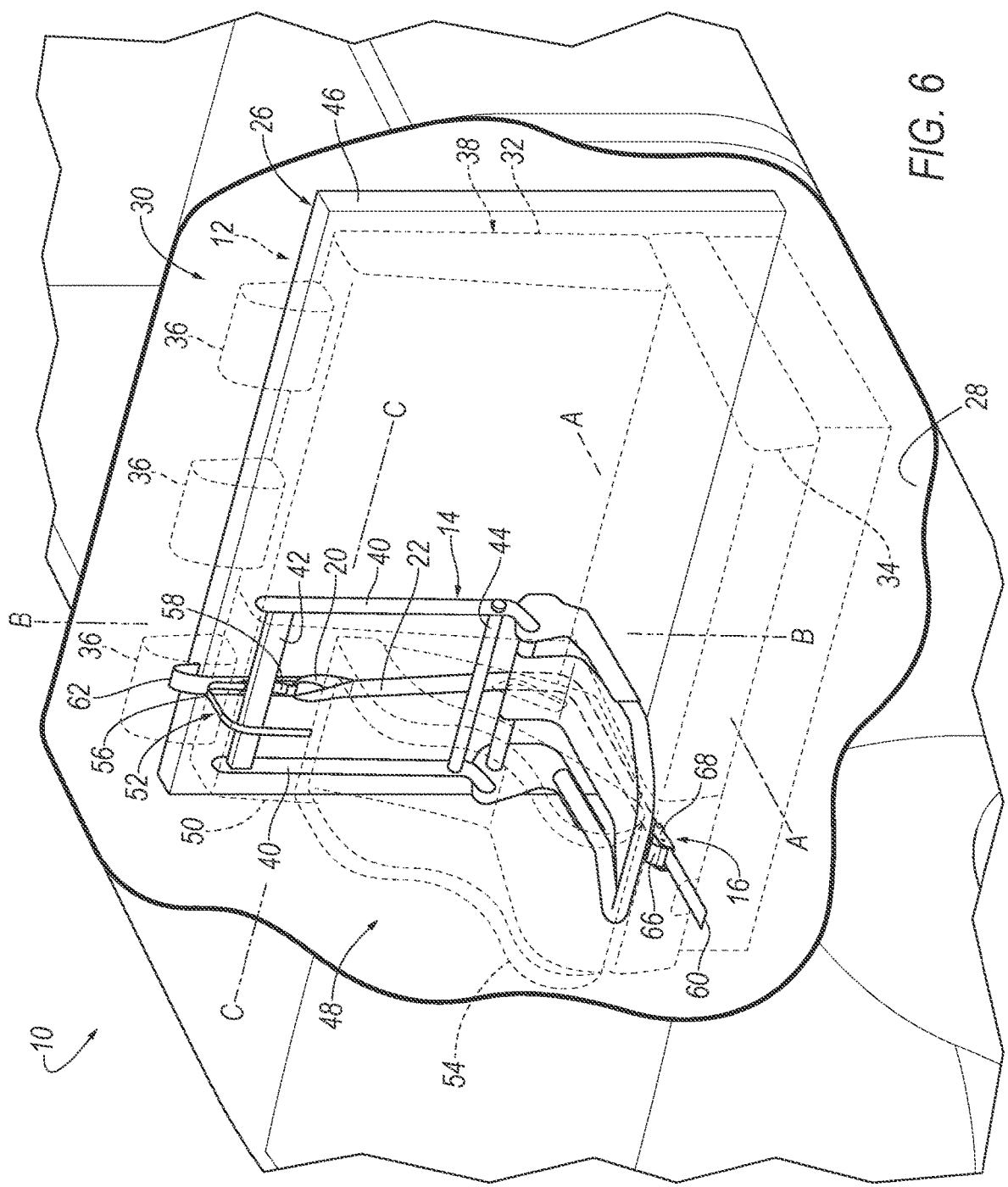
FIG. 6 is a perspective view of a second example of a child restraint system anchor in a raised position.
Figure 7:
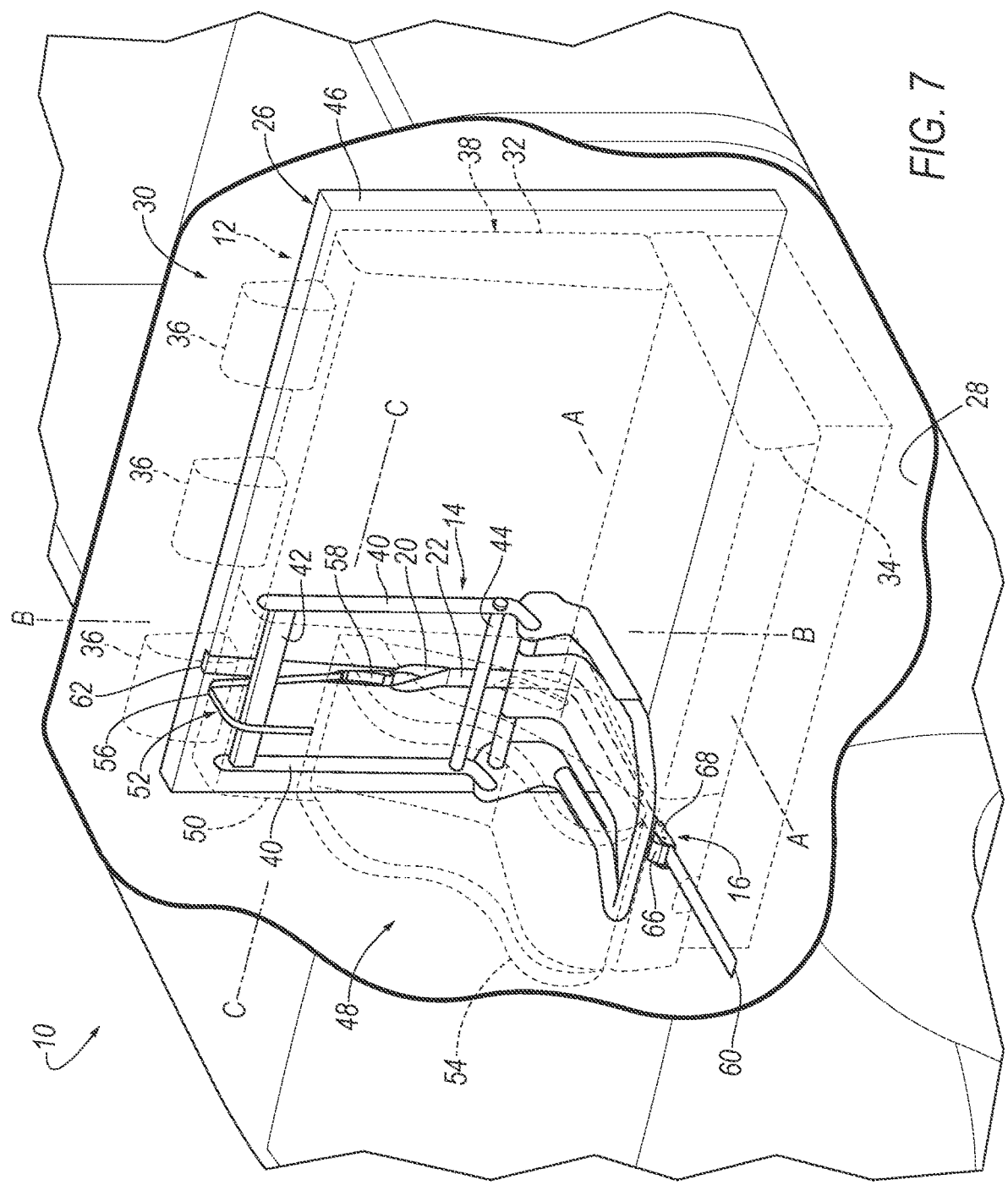
FIG. 7 is a perspective view of the second example of the child restraint system anchor in a lowered position.

Two example of the anchor 18 are shown in the Figures and common numerals are used to identify common features in the example embodiments. One example of the anchor 18 is shown in FIGS. 3-5. In such an example, the anchor 18 extends through the vehicle seat 12 and the lock 16 is fixed to a seatback 32 of the vehicle seat 12. A second of the anchor 18 is shown in FIGS. 6-7. In such an example, the anchor 18 extends along the seatback 32 and a seat bottom 34 of the seat 12 with the lock 16 being fixed relative to the seat bottom 34.

Figure 2:
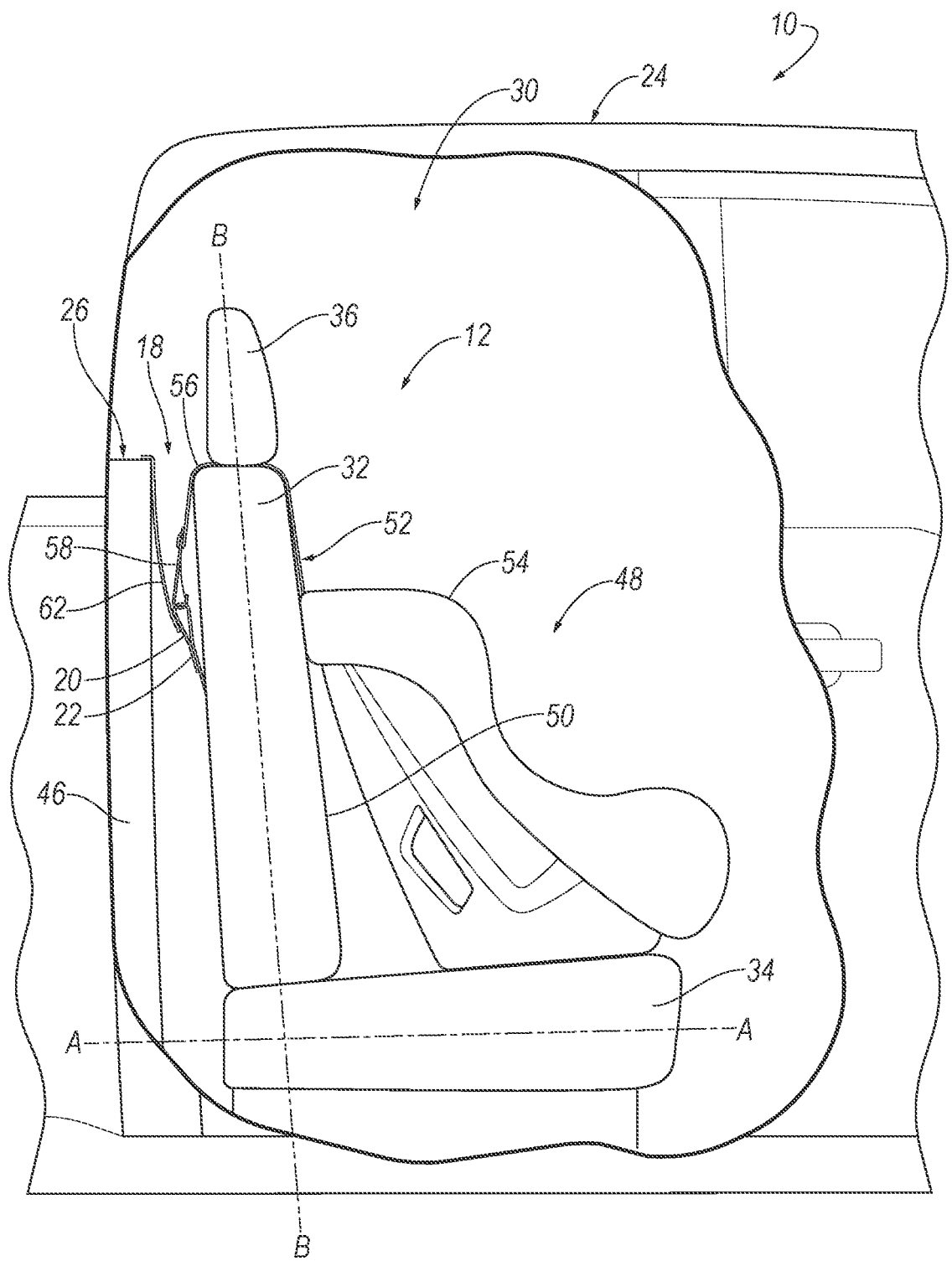
FIG. 2 is a side view of the seat with the child restraint system installed.

With reference to FIGS. 1-2, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

As described further below, the vehicle 10 includes a vehicle body 24 including vehicle body panels 26, vehicle floor 28, vehicle roof (not numbered), etc. The vehicle 10 includes a passenger compartment 30 to house occupants, if any, of the vehicle 10. The passenger compartment 30 may extend across the vehicle 10, i.e., from one side to the other side of the vehicle 10. The passenger compartment 30 includes a front end and a rear end with the front end being in front of the rear end during forward movement of the vehicle 10.

The vehicle 10 includes the vehicle floor 28 that defines the lower boundary of the passenger compartment 30 and may extend from the front end of the passenger compartment 30 to the rear end of the passenger compartment 30. The vehicle floor 28 may include upholstery, for example, carpet, and may have a class-A surface facing the passenger compartment 30, i.e., a surface specifically manufactured to have a high quality, finished, aesthetic appearance free of blemishes.

With continued reference to FIGS. 1-2, the vehicle 10 may include one or more vehicle seats 12, herein referred to as seats 12, supported by the vehicle floor 28. Specifically, the vehicle 10 may include any suitable number of seats 12. The seats 12 are supported by the vehicle floor 28. The seats 12 may be arranged in any suitable arrangement in the passenger compartment 30. One or more of the seats 12 may be at the front end of the passenger compartment 30, e.g., a driver seat and/or a passenger seat. In other examples, one or more of the seats 12 may be behind the front end of the passenger compartment 30, e.g., at the rear end of the passenger compartment 30. The seats 12 may be movable relative to the vehicle floor 28 to various positions, e.g., movable fore-and-aft and/or cross-vehicle.

As in the examples shown in the Figures, the seat 12 at the rear of the vehicle 10 may be a bench seat 12, i.e., the seat 12 extends from one side of the passenger compartment 30 to the other side of the passenger compartment 30. In such an example, multiple occupants may be seated on the rear seat 12. In the examples shown in the Figures, three occupants may be properly seated along the rear seat 12 with two of the occupants being vehicle-outboard occupants and one of the occupants being between the vehicle-outboard occupants, i.e., a middle occupant. The seat 12 may be segmented into separate portions to accommodate the occupants. For example, the seat 12 may include two outboard portions and a middle portion with the outboard portions accommodating vehicle-outboard portions and the middle portion accommodating a middle occupant. As described further herein, the disclosure discusses one of the vehicle-outboard portions, however, this disclosure may apply to other seating locations within the vehicle 10. In other examples, the seat 12 may be of any suitable type, e.g., a bucket seat, a captain's seat, etc.

The seats 12 include a seatback 32, a seat bottom 34, and a head restraint 36. The head restraint 36 may be supported by and extending upwardly from the seatback 32. The head restraint 36 may be stationary or movable relative to the seatback 32. The seatback 32 may be supported by the seat bottom 34 and may be stationary or movable relative to the seat bottom 34. The seatback 32 may extend from an upper end to a lower end. The lower end may be connected to the seat bottom 34. The upper end of the seatback 32 may be spaced upwardly from the lower end of the seatback 32, i.e., upwardly from the seat bottom 34. The seatback 32, the seat bottom 34, and the head restraint 36 may be adjustable in multiple degrees of freedom. Specifically, the seatback 32, the seat bottom 34, and the head restraint 36 may themselves be adjustable. In other words, adjustable components within the seatback 32, the seat bottom 34, and the head restraint 36 may be adjustable relative to each other.

With reference to FIGS. 3-7, the seatback 32 includes the seat frame 14 and a covering 38 supported on the seat frame 14. The seat frame 14 may include tubes, beams, etc. The seatback 32 and the seat bottom 34 may include the seat frame 14. The seat frame 14 of the seatback 32 may include a pair of upright frame members 40. The upright frame members 40 are elongated, and specifically, are elongated in a generally upright direction when the seatback 32 is in a generally upright position. The upright frame members 40 are spaced cross-seat from each other. The seat frame 14 of the seatback 32 includes one or more cross-members 42, 44 extending from one upright frame member 40 to the other upright frame member 40. Specifically, in the examples shown in the Figures, the seat frame 14 of the seatback 32 includes a first cross-member 42 and a second cross-member 44 spaced from each other along the upright frame members 40. One may be near the upper end of the seatback 32 and the other may be at the lower end of the seatback 32. The seat frame 14, including the upright frame members 40, may be of any suitable plastic material, e.g., carbon fiber reinforced plastic (CFRP), glass fiber-reinforced semi-finished thermoplastic composite (organosheet), etc. As another example, some or all components of the seat frame 14 may be formed of a suitable metal, e.g., steel, aluminum, etc.

The covering 38 may include upholstery, padding, and/or plastic portions. The upholstery may be cloth, leather, faux leather, or any other suitable material. The upholstery may be stitched in panels around the seat frame 14. The padding may be between the covering 38 and the seat frame 14 and may be foam or any other suitable material.

The seatback 32 may be elongated upwardly from the seat bottom 34 along a first axis A. The seat bottom 34 may be elongated along a second axis B transverse to the first axis A. In other words, the upright frame members 40 of the seatback 32 extend upwardly from the seat bottom 34 along the first axis A. The cross-members 42, 44 may each be elongated along a third axis C between the upright frame members 40 that is transverse to the first axis A.

The vehicle 10 includes a plurality of vehicle body panels 26. One of the vehicle body panels 26 may be at the rear end of the passenger compartment 30. For example, the vehicle body panels 26 may be a bulkhead 46 elongated along the rear end of the passenger compartment 30. The bulkhead 46 may extend from one side of the vehicle 10 to the other side of the vehicle 10. The bulkhead 46 is vehicle-rearward of the seat 12, specifically, the rear seats 12 of the vehicle 10. In other words, the seats 12 are vehicle-forward of the bulkhead 46. The seatback 32 of the seat 12 may be adjacent the bulkhead 46. The bulkhead 46 is made of the same material as the rest of the body of the vehicle 10, e.g., metal.

The seat 12, specifically, the seatback 32 and the seat bottom 34, defines an occupant seating area 48 of the seat 12. The occupant seating area 48 is the area occupied by an occupant when properly seated on the seat bottom 34 and the seat 12 back. The occupant seating area 48 is in a seat-forward direction of the seatback 32 and above the seat bottom 34. In the example shown in the Figures, the occupant seating area 48 faces the front end of the passenger compartment 30 when the seat 12 is in the forward-facing position and the occupant seating area 48 faces the rear end of the passenger compartment 30 when the seat 12 is in the rearward-facing position. The seatback 32 of the seat 12 is between the occupant seating area 48 and the vehicle body panels 26. Specifically, the seatback 32 of the seat 12 is between the occupant seating area 48 and the bulkhead 46.

The seatback 32 may have one or more bolsters 50 on sides of the occupant seating area 48. The bolsters 50 are elongated, and specifically, are elongated in a generally upright direction when the seatback 32 is in a generally upright position. The bolsters 50 may define cross-seat boundaries of the seatback 32, i.e., the seatback 32 may terminate at the bolsters 50. The bolsters 50 may extend in a seat-forward direction relative to the occupant seating area 48, i.e., on opposite sides of the torso and shoulders of an occupant seated on the seat 12. The extension of the bolsters 50 relative to the occupant seating area 48 may be defined by the upright frame members 40 and/or the covering 38. In the example shown in the Figures, the size and shape of both the upright frame members 40 and the covering 38 form the bolsters 50. In the example shown in the Figures, the seatback 32 may define a bolster 50 at the outboard portions of the bench seat. For example, the bolster 50 may be only on the vehicle-outboard most portion of the seatback 32.

With continued reference to FIGS. 3-7, the vehicle 10 includes the anchor 18 that is designed to be connectable to a child restraint system 54 when the child restraint system 54 is installed into the vehicle 10. Specifically, the child restraint system 54 includes a connection point 52, that is connectable to the anchor 18 to install the child restraint system 54. The connection point 52 may be a clip such as a clip including an open loop and flexible gate, an "alligator" style clip defining a slot with a button actuated latch, or any other suitable configuration for connecting to the respective anchor 18, including in some examples that are currently known. The connection point 52 may be configured for attachment to the anchor 18 that meets a standard, e.g., ISOFIX, LATCH, LUAS, UCSSS, etc. The example shown in the Figures includes a child restraint system 54 having a strap 56 and a clip 58 that is connectable to the anchor 18. The child restraint system 54 may include further attachment points that connect to other features of the vehicle 10, e.g., other portions of the seat 12 or vehicle body 24 such as anchors meeting a standard, ISOFIX, LATCH, LUAS, UCSSS, etc., including in some examples those that are currently known.

In the illustrations in the Figures, the anchor 18 and the child restraint system 54 are shown in one of the seating locations of the seat 12. The anchor 18 may be positioned at any suitable seating location in the vehicle 10.

The anchor 18 and at least the connection point 52 of the child restraint system 54 is behind the seatback 32 when the connection point 52 is connected to the anchor 18. In other words, the seatback 32 is between the occupant seating area 48 and at least a portion of the anchor 18, e.g., at least the connection point 52 of the child restraint system 54 when the connection point 52 is connected to the anchor 18.

At least a portion of the anchor 18 is between the seat 12 and at least one of the vehicle body panels 26. Specifically, in the example shown in the Figures, the anchor 18 is between the seatback 32 of the seat 12 and the bulkhead 46. The anchor 18 is connected to one of the vehicle body panels 26. Specifically, in the example shown in the Figures, the anchor 18 is connected to the bulkhead 46 behind the seatback 32. As described further below, in the examples shown in the Figures, the anchor 18 may be connected indirectly to the vehicle body panels 26. In such examples, the vehicle 10 may include a tether 62 fixed to the vehicle body panel 26. Specifically, the tether 62 is fixed to the bulkhead 46 between the seat 12 and the bulkhead 46. In other examples, the anchor 18 may be directly connected to the bulkhead 46 such that the anchor 18 is movable relative to the seat 12.

The vehicle 10 includes the lock 16 that is fixed relative to the seat 12. As discussed further below, the anchor 18 is releasably lockable by the lock 16 relative to the seat 12. The lock 16 may engage with the anchor 18 to tighten the connection point 52 of the child restraint system 54 when the child restraint system 54 is installed in the vehicle 10. The lock 16 may be disengaged from the anchor 18 to loosen the connection point 52 to remove the child restraint system 54 from the vehicle 10. The lock 16 is fixed relative to the seat 12. Depending on the example, as discussed further below, the lock 16 may be fixed relative to the seatback 32 or the lock 16 may be fixed relative to the seat bottom 34. The lock 16 may be fixed at any suitable location relative to the seat 12. The lock 16 may be fixed in any suitable way, e.g., fasteners, welding, etc.

With continued reference to FIGS. 3-7, the anchor 18 includes the loop 20 and the webbing 22. The loop 20 of the anchor 18 is designed to engage with a child restraint system 54. The connection point 52 of the child restraint system 54 is connectable to the loop 20 of the anchor 18 to install the child restraint system 54 into the vehicle 10. For example, as shown in the Figures, the child restraint system 54 includes the strap 56 and the clip 58 that is connectable to the loop 20 of the anchor 18. The bolster 50 is vehicle-outboard of the loop 20.

The webbing 22 extends from the loop 20 to the lock 16. The webbing 22 extends through the lock 16. In other words, the webbing 22 includes a distal end 60 and the lock 16 is between the loop 20 and the distal end 60. A user may grasp the distal end 60 to tighten the webbing 22 relative to the child restraint system 54. The webbing 22 may be any suitable material. For example, the webbing 22 may be fabric, e.g., woven nylon, polyester, etc. In the example shown in the Figures, the connection point 52 is a loop at an end of the webbing 22. Specifically, in such an example, the connection point 52 may be an end of the webbing 22 looped and sewn to itself.

The vehicle 10 may include the tether 62 fixed to the vehicle body panel 26 between the seat 12 and the vehicle body panel 26. Specifically, in the examples shown in the Figures, the tether 62 is fixed to the bulkhead 46 between the seat 12 and the bulkhead 46. The tether 62 extends from the vehicle body panel 26 to the anchor 18. Specifically, the tether 62 extends from the vehicle body panel 26 to the webbing 22 of the anchor 18. The tether 62 is connected to the anchor 18. Specifically, the tether 62 is fixed to the anchor 18. The tether 62 is fixed to the anchor 18 in any suitable way such that the tether 62 remains connected to the anchor 18. For example, the tether 62 is fixed by stitching or fasteners such that the tether 62 remains connected to the anchor 18. The tether 62 allows the occupant or the user to pull the anchor 18, e.g., the webbing 22, from behind the seatback 32 to connect the connection point 52 of the child restraint system 54 to the loop 20. The tether 62 may be fixed in any suitable way to the bulkhead 46, e.g., fasteners, welding, etc.

The anchor 18 is movable relative to the bulkhead 46 and the seat 12. Specifically, the webbing 22 of the anchor 18 is movable relative to the bulkhead 46 and the seat 12. The webbing 22 of the anchor 18 is movable from a raised position to a lowered position. The user may connect the connection point 52 to the loop 20 when the webbing 22 is in the raised position and the connection point 52 may be concealed behind or in the seatback 32 when the webbing 22 is in the lowered position. The movability of the webbing 22 of the anchor 18 allows the connection point 52 of the child restraint system 54 to be moved relative to the bulkhead 46 and the seat 12 without having to move the seat 12 relative to the bulkhead 46. In other words, the webbing 22 of the anchor 18 may be pulled by the occupant or the user to tighten the strap 56 of the child restraint system 54 to install the child restraint system 54 in the vehicle 10. As the user pulls the webbing 22, the anchor 18 moves from the raised position to the lowered position. As the user pulls the anchor 18, specifically, the webbing 22 of the anchor 18, the anchor 18 moves relative to the seat 12 and the strap 56 of the child restraint system 54 is tightened relative to the seat 12 to install the child restraint system 54 in the vehicle 10. In other words, any slack in the webbing 22 and strap 56 of the connection point 52 is removed and the webbing 22 is tightened relative to the seatback 32.

The lock 16 may be movable from the unlocked position to the locked position. As discussed above, the anchor 18 is releasably lockable by the lock 16 relative to the seat 12. Specifically, the webbing 22 is releasably lockable by the lock 16 relative to the seat 12. The anchor 18 is engageable with the lock 16. Specifically, the webbing 22 is engageable with the lock 16. The webbing 22 is engageable with the lock 16 such that when the lock 16 is in the locked position, the webbing 22 is not movable relative to the lock 16 in one direction but is movable in the other direction. In the locked position, the lock 16 may allow the webbing 22 to be movable relative to the lock 16 in one direction and disallow the webbing 22 to be movable relative to the lock 16 in the other direction. The lock 16 may allow the webbing 22 to be movable to the lowered position but disallows the webbing 22 from moving back to the raised position without the lock 16 being moved to the unlocked position. The lock 16 may include teeth, clamps, etc. that engage with the webbing 22 to restrict movement of the webbing 22 relative to the lock 16 in one direction but allows the webbing 22 to move relative to the lock 16 in the other direction. In other words, by default, the lock 16 remains in the locked position. The webbing 22 being moveable in one direction but not the other direction when the lock 16 is in the locked position allows an occupant or a user to pull the webbing 22 through the lock 16 in one direction to tighten the connection point 52 of the child restraint system 54 when the child restraint system 54 is installed in the vehicle 10. The webbing 22 being locked in the other direction allows tension in the connection point 52 and webbing 22 to be maintained during use of the vehicle 10 because the webbing 22 remains engaged with the lock 16. In other words, the webbing 22 being locked in one direction maintains the removal of any slack in the webbing 22 and the connection point 52.

Figure 8A:
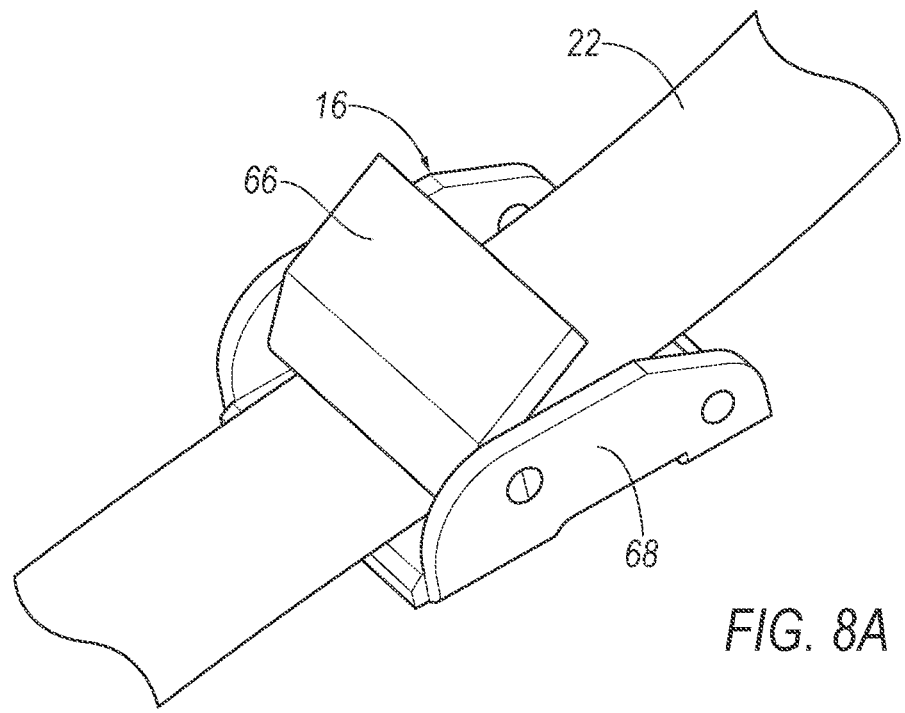
FIG. 8A is a perspective view of a lock engageable with the child restraint system anchor in a locked position.
Figure 8B:
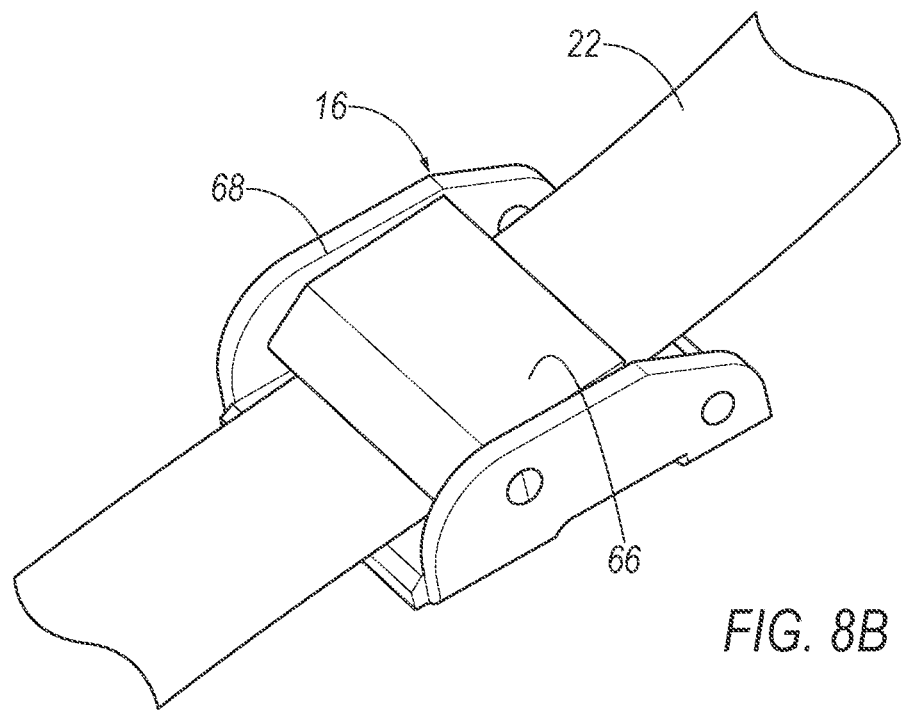
FIG. 8B is a perspective view of the lock engageable with the child restraint system anchor in an unlocked position.

With reference to FIGS. 8A and 8B, the lock 16 may include a paddle 66 and a lock housing 68. The paddle 66 moves the lock 16 from the locked position to the unlocked position. As shown in FIG. 8A, in the locked position, the paddle 66 may extend upwardly from the lock housing 68, e.g., the paddle 66 may be angled upwardly relative to the lock housing 68. To move the lock 16 from the locked position to the unlocked position, and as shown in FIG. 8B the paddle 66 of the lock 16 may be pushed downwardly toward the lock housing 68. As stated above, the lock 16 remains in the locked position by default. In other words, the paddle 66 extends upwardly by default and a user may push the paddle 66 downwardly toward the lock housing 68 to move the lock 16 to the unlocked position. The lock 16 shown in FIG. 8A is in the locked position and the lock 16 shown in FIG. 8B is in the unlocked position.

With continued reference to FIGS. 3-7, the webbing 22 is movable relative to the seat 12 in the unlocked position. Specifically, the webbing 22 is movable in both directions relative to the seat 12 when the lock 16 is in the unlocked position. In other words, when the lock 16 is in the unlocked position, the webbing 22 may freely move through the lock 16. Moving the lock 16 to the unlocked position releases tension in the webbing 22 and the connection point 52 to aid in removal of the child restraint system 54 from the vehicle 10. To move the lock 16 to the unlocked position, the lock 16 must be acted on by an outside force, e.g., an occupant or a user, to move the lock 16 to the unlocked position. Specifically, when the lock 16 is not acted on by an outside force, e.g., an occupant of the vehicle 10 or a user, the lock 16 remains in the locked position. As described above, the lock 16 remains in the locked position by default. The lock 16 may include features, such as springs, which bias the lock 16 to the locked position when the lock 16 is not being acted on by an outside force.

With reference to the example shown in FIGS. 3-5, the lock 16 is fixed relative to the seatback 32. Specifically, the lock 16 is fixed to the seatback 32 of the seat 12. The lock 16 is fixed to the seat frame 14 of the seatback 32. Specifically, the lock 16 is fixed to one of the upright frame members 40 of the seat frame 14. In other words, the lock 16 is fixed at the bolster 50. In the example shown in FIGS. 3-5, the lock 16 is fixed to the upright frame member 40 that is vehicle-outboard to provide easier access to the lock 16 by the user who is tightening the anchor 18.

The seat 12 may include a beam 64 that extends diagonally from one of the upright frame members 40 to one of the cross-members 42, 44. Specifically, the beam 64 extends diagonally from the vehicle-inboard upright frame member 40 to the second cross-member 44. The beam 64 is fixed to the upright frame member 40 and the second cross-member 44. In other words, the beam 64 is immovable relative to the upright frame member 40 and the second cross-member 44. The beam 64 may be of any suitable material. For example, the beam 64 may be of the same material as the seat frame 14.

With continued reference to the example shown in FIGS. 3-5, the webbing 22 of the anchor 18 extends through the seatback 32 to the lock 16. In other words, the webbing 22 of the anchor 18 may extend into the covering 38 of the seat 12 and the seat frame 14 through, for example, a hole (not shown), in the back side of the seatback 32. The webbing 22 is routed around the beam 64 from the loop 20 to the lock 16. In other words, the webbing 22 extends from the loop 20, around the beam 64, and to the lock 16. The webbing 22 extends from along the seatback 32 from the loop 20 to the beam 64. The webbing 22 extends around the beam 64 and to the lock 16. In other words, the webbing 22 extends along the first axis A from the loop 20 to the beam 64 and the webbing 22 extends along the third axis C from the beam 64 and to the lock 16. Specifically, the webbing 22 changes directions when the webbing 22 extends around the beam 64. The changing of directions of the webbing 22 allows the webbing 22 to be pulled by a user from the bolster 50 of the seat 12 to remove slack from the webbing 22 and connection point 52. In other words, the changing of directions allows the connection point 52 of the child restraint system 54 to be tightened from the side of the seat 12, i.e., the bolster 50 of the seat 12.

With reference to the example shown in FIGS. 6-7, the lock 16 is fixed relative to the seat bottom 34. Specifically, the lock 16 is supported by the seat frame 14 of the seat bottom 34. The lock 16 may be fixed below the seat bottom 34. The lock 16 may be between the seat 12 and the vehicle floor 28. At least a portion of the seat bottom 34 is between the occupant seating area 48 and the lock 16. The lock 16 may be fixed in a position such that the user has access to the lock 16 to move it to the unlocked position when necessary. In other examples not shown in the Figures, the lock 16 may be fixed to the vehicle floor 28.

The webbing 22 is disposed behind the seatback 32 and below the seat bottom 34 from the loop 20 to the lock 16. The webbing 22 extends along the seatback 32 and along the seat bottom 34 from the loop 20 to the lock 16. Specifically, the webbing 22 extends along the first axis A and along the second axis B. In other words, the webbing 22 includes a first portion extending along the first axis A and a second portion extending along the second axis B. The first portion is elongated from the loop 20 to the seat bottom 34. The second portion is elongated from the seat bottom 34 to the lock 16. In other words, the seat bottom 34 is between the occupant seating area 48 and the webbing 22.

With continued reference to the example shown in FIGS. 6-7, the second portion being elongated along the seat bottom 34 and the lock 16 being between the seat bottom 34 and the vehicle floor 28 allows the occupant or the user to pull the webbing 22 through the lock 16 from the front of the seat 12. The webbing 22 may be pulled by the occupant toward the front end of the vehicle 10 to remove the slack from the webbing 22 and the connection point 52 of the child restraint system 54.

In both examples described above, when installing the child restraint system 54 into the vehicle 10, the connection point 52 of the child restraint system 54 may be connected to the loop 20 of the anchor 18. The user may pull on the tether 62 upwardly to reveal the loop 20 above the seatback 32 to provide accessibility of the loop 20 to connect the connection point 52. In other words, pulling the tether 62 upwardly may move the webbing 22 to the raised position if the lock 16 is in the unlocked position. After the connection point 52 is connected to the loop 20, the webbing 22 may be pulled through the lock 16 in a single direction to tighten the connection point 52 of the child restraint system 54. In other words, any slack in the connection point 52 and the webbing 22 is removed by pulling the webbing 22 through the lock 16 and the webbing 22 is moved to the lowered position. Once the webbing 22 is pulled to the desired tightness, the lock 16 remains in the locked position to maintain tension in the webbing 22 and the connection point 52 of the child restraint system 54 and the webbing 22 remains in the lowered position.

When the user removes the child restraint system 54 from the vehicle 10, the occupant applies a force to the lock 16 to move the lock 16 to the unlocked position. Moving the lock 16 to the unlocked position allows the tension to be released in the webbing 22 and the connection point 52 of the child restraint system 54 to aid in removing the child restraint system 54 from the vehicle 10. After the tension is released and slack has been added back to the connection point 52 and the webbing 22, the user may pull the tether 62 upwardly relative to the seatback 32 to reveal the loop 20 to move the webbing 22 to the raised position. The connection point 52 may then be released from the loop 20 to remove the child restraint system 54 from the vehicle 10.

The disclosure has been described in an illustrative manner, and it is to be understood that the terminology which has been used is intended to be in the nature of words of description rather than of limitation. The numerical adverbs "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a vehicle seat having a seat frame;
   a lock fixed to the vehicle seat, the lock being movable from an unlocked position to a locked position; and
   a child restraint system anchor having a loop and a webbing, the webbing extending from the loop to the lock, the lock being between the distal end and the loop; and
   the webbing extending through the lock, the lock allowing the webbing to move relative to the lock in a tightening direction and in a loosening direction when the lock is in the unlocked position, and the lock allowing the webbing to move in the tightening direction and preventing the webbing from moving in the loosening direction when the lock is in the locked position, the loop moving toward the lock in the tightening direction and away from the lock in the loosening direction.

2. The vehicle of claim 1, wherein the vehicle seat includes a seatback and the seatback includes the seat frame, the lock being fixed to the seatback, and the webbing extending through the seatback to the lock.

3. The vehicle of claim 2, further comprising a vehicle body panel adjacent the seatback, the child restraint system anchor being connected to the vehicle body panel between the vehicle body panel and the seatback of the vehicle seat.

4. The vehicle of claim 3, further comprising a tether fixed to the vehicle body panel between the vehicle seat and the vehicle body panel, the tether extending from the vehicle body panel to the child restraint system anchor.

5. The vehicle of claim 2, wherein the seatback includes a bolster vehicle-outboard of the loop, the lock being fixed to the seat frame at the bolster.

6. The vehicle of claim 1, wherein:
the vehicle seat includes a seat bottom and a seatback supported by the seat bottom;
the seat bottom and the seatback including the seat frame;
the lock being fixed relative to the seat bottom; and
the webbing extends along the seat bottom and the seatback to the lock.

7. The vehicle of claim 6, wherein the seatback is elongated along a first axis and the seat bottom is elongated along a second axis transverse to the first axis, a first portion of the webbing extending along the first axis and a second portion of the webbing extending along the second axis.

8. The vehicle of claim 6, wherein the webbing extends along the seatback and the seat bottom from the loop to the lock.

9. The vehicle of claim 6, wherein the webbing is disposed behind the seatback and below the seat bottom from the loop to the lock.

10. The vehicle of claim 1, wherein the seat frame includes a pair of upright frame members spaced cross-seat from each other and a first cross-member extending from one upright frame member to the other upright frame member, the lock being fixed to one of the upright frame members.

11. The vehicle of claim 10, wherein the seat frame includes a second cross-member extending from one upright frame member to the other upright frame member and a beam extending diagonally from an upright frame member to the second cross-member, the webbing extending from the loop, around the beam, and to the lock.

12. The vehicle of claim 10, wherein the upright frame members extend along a first axis and the cross-members extend along a second axis, a first portion of the webbing extending along the first axis and a second portion of the webbing extending along the second axis.

13. The vehicle of claim 1, further comprising a vehicle body panel adjacent the vehicle seat, the child restraint system anchor being connected to the vehicle body panel between the vehicle body panel and the vehicle seat.

14. The vehicle of claim 13, wherein the vehicle seat includes a seat bottom and a seatback supported by the seat bottom and the vehicle seat defines an occupant seating area, the seat bottom being between the occupant seating area and the webbing.

15. The vehicle of claim 14, wherein the seat bottom is between the occupant seating area and lock.

16. The vehicle of claim 14, wherein the seatback is between the occupant seating area and child restraint system anchor.

17. The vehicle of claim 14, wherein the seatback is between the occupant seating area and the vehicle body panel.

18. The vehicle of claim 13, further comprising a tether fixed to the vehicle body panel and the tether extending from the vehicle body panel to the child restraint system anchor.

19. The vehicle of claim 1, further comprising a vehicle floor, the vehicle seat being supported by the vehicle floor and the lock is fixed between the vehicle seat and the vehicle floor.

20. The vehicle of claim 1, wherein the loop is connectable to a connection point of a child restraint system.

* * * * *